J. H. AKINS
SHIM.
APPLICATION FILED OCT. 23, 1916.

1,424,063.

Patented July 25, 1922.

Inventor
J. H. Akins,

Witness
Chr. Nielsen, Jr.

By Jerry A. Mathews,
Attorney

UNITED STATES PATENT OFFICE.

JEFFERSON H. AKINS, OF LEWISTOWN, MONTANA.

SHIM.

1,424,063. Specification of Letters Patent. Patented July 25, 1922.

Application filed October 23, 1916. Serial No. 127,282.

*To all whom it may concern:*

Be it known that I, JEFFERSON HALBERT AKINS, a citizen of the United States, residing at Lewistown, in the county of Fergus and State of Montana, have invented certain new and useful Improvements in Shims, of which the following is a specification.

The invention has for an object to effect an improvement in the devices for securing demountable rims for pneumatic and other tires upon a wheel, and relates particularly to the well known form of construction in which the rim is held in place by a number of removable wedges (sometimes known as "clamping lugs") inserted between the demountable rim and the felly, in opposition to inclined lugs or other elements carried permanently on the wheel, the movable wedges being forced into and secured in place by means of bolts and nuts.

In the use of these devices, which has now become quite general, it is found that through corrosion and wear the wedge elements fail to engage tightly between the demountable rim and the felly band when the tightening bolts and nuts are screwed as far as they can be. This is usually due to the fact that the keeper flange of the wedge becomes engaged against the side of the felly before the wedge can be forced inwardly a sufficient distance between the demountable rim and felly. The wedge would usually be large enough, if it could be moved inward further, but on account of the requirement in such devices, it is not practicable to give the wedge, no matter what its size, the necessary range of movement to compensate for wear and corrosion. The substitution of new wedges will not in each case remedy the fault, as erosion of the permanent lugs on the felly may be such that new removable wedges will not serve to remedy the fault. The substitution of new wedges is also expensive, and the provision of larger sizes of wedges to be used after smaller ones have become ineffective also involves a considerable expense and a complication in use that would be extremely undesirable in the art.

I have therefore provided a new article of manufacture which can be produced very cheaply from stock sheet material, adapted to be used with any of the various forms of wedges used in securing demountable rims in place, without requiring any change in structural form of the wedge or wheel parts, and permitting the use of the fastening devices already provided.

Figure 1:
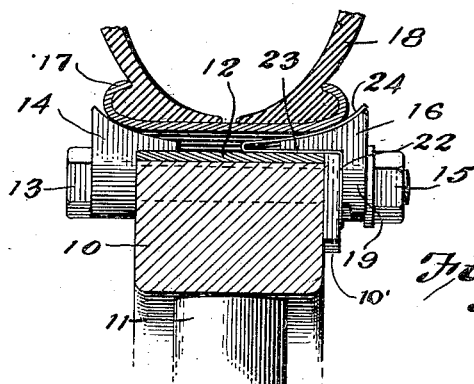
Figures 2, 3, 5:
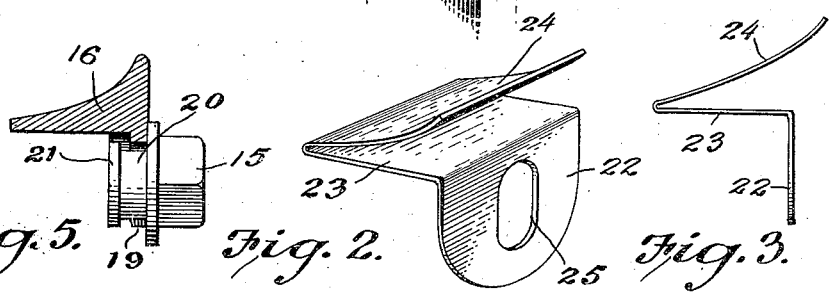
Figure 4:
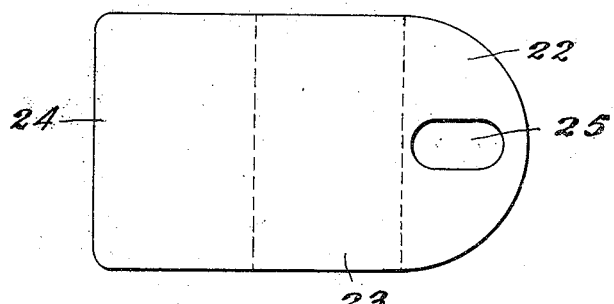

Additional objects, advantages and features of invention are involved in my device, as will appear from the following description and drawings, in which, Figure 1 is a fragmentary cross sectional view of a wheel of a familiar type having its demountable rim and securing wedges, equipped with my invention, Fig. 2 is a perspective view of the filler device, Fig. 3 is an end elevation thereof, Fig. 4 is a plan view of the blank for the device, Fig. 5 is a detail of a wedge.

There is illustrated a portion of a wheel including the felly 10 carried by spokes in the usual manner, as at 11, the felly having a suitable metal band 12 therearound, and being provided with a number of bolts 13, the heads of which serve to hold permanently upon the wheel inner wedge elements 14, the ends of the bolts projecting at the opposite side of the felly for engagement by the nuts 15 of the removable wedges 16, and having wear plates 10' thereon. The wedges 14 and 16 are suitably shaped to engage over the outer side of the band 12 beneath the demountable rim 17, upon which a tire 18 of any kind may be carried. The felly, band, rim, and wedge construction may be of any well known construction of which there are several forms. The wedge ordinarily includes a keeper flange 19, extending inwardly beside the felly when the wedge is engaged under the rim 17, the nuts 15 ordinarily having a neck portion 29 extending through the keeper 19, the neck having a lateral flange 21 at the inner end by which its casual disengagement from the keeper is prevented, and by which unscrewing of the nut will draw the wedge outwardly from beneath the rim 17. The nut is loosely connected to the keeper, so that when the nut is unscrewed a short distance the wedge may be readily turned inwardly on the wheel to lie out of the path of the rim 17 as withdrawn. The aperture in the keeper 19 through which the nut is engaged is ordinarily slightly elongated, so that after the wedge has been drawn outwardly a distance, its outer part may be forced inwardly, permitting the rim to readily clear it when withdrawn laterally from the wheel.

My invention consists of a plate of sheet metal of elongated form, bent to conform to the shape of the inner and outer convergent faces of the wedge, and the inner face of the keeper flange 19, having an elongated opening therein to register with the opening through the keeper 19. The plate consists of the keeper portion 22, adapted to lie against the side of the felly beneath the keeper 19, a lower filler portion 23 extended at right angles therefrom and adapted to lie snugly over the rim 12, and an upper filler portion 24, bent inwardly over the portion 23 at an acute angle, and curved gradually upward so that it will lie snugly upon the upper side of the wedge when the latter is inserted between the two filler portions. The curving of the upper filler portion 24 is not essential, however, nor is it necessary for it to conform exactly to the form of the wedge, as the metal is thin enough to adapt itself to the necessary form when the wedge is forced into place. The aperture 25 in the keeper part of the filler extends fully to the angle at the junction of the keeper portion with the lower filler portion 23, this aperture being elongated to permit free removal of the filler from under the demountable rim at the same time as the wedge is disengaged, moving practically as a unit therewith, in practice.

In practice, the filler device is made from galvanized iron sheet metal of 24 gauge, being stamped out in the form shown in Fig. 4, the end utilized to form the keeper portion 22, being rounded as shown. The aperture 25 may be formed at the same time that the blank is cut. After the forming of the blank, the rounded end portion is bent into a plane at right angles to the central part of the blank, on a line coincident with the inner edge of the opening 25, and the opposite end portion of the blank is then bent inwardly over the intermediate portion on a line spaced from the point of the first bending a distance in the neighborhood of three-eighths of an inch greater than the distance between the inner face of the keeper flange 19 and the inner edge of the wedge 16, this bend being rounded, so that the filler device has a minimum thickness at its inner part less than that of the wedge. The upper filler element extends outwardly a distance beyond the plane of the keeper portion 22 of the filler so that there is certain to be enough in this upper filler portion to cover all of the outer side of the wedge 16.

In use, when it is found that wedges fail to secure the demountable rim in place, a suitable number of the filler devices are secured, the wedges 16 removed entirely from the bolts 13 of the wheel, and inserted between the filler portions 23—24, with the opening 25 alined with the opening through the nut 15, after which they are reintroduced upon the wheel in the same way ordinarily practiced, and the filler device and wedge can then be readily manipulated as one unit, for securing the demountable rim in place. It will be found that with this filler device, the rim can easily be secured firmly upon the wheel with a minimum difficulty, and without impairing the efficiency of the demountable rim and wheel construction or the fastening devices therefor.

It is apparent that a desirable article of manufacture is presented, which may be produced at a low cost and attaining desirable utility.

What is claimed:

1. An auxiliary for clamping lugs of demountable rims comprising a strip of sheet metal having one end portion provided with a longitudinal slot to receive a bolt, the intermediate portion of the strip being bent to extend at right angles to said end portion a distance, the other end portion being bent inward over the said intermediate portion at an acute angle, and away from the first named end portion, and being extended beyond the junction of said intermediate portion and first mentioned end portion.

2. A shim, for detachable wheel rims and their clamping lugs, comprising a strip of sheet metal bent to form portions arranged at an acute angle to each other for fitting above and below the head of a lug and between the same and the base of a detachable rim and the periphery of the felly of a wheel, respectively, and a portion on the shim to be clamped between the lug and the side of the felly for the purpose specified.

3. A shim, for detachable wheel rims and their clamping lugs, comprising a strip of sheet metal bent to form portions arranged at an acute angle to each other for fitting above and below the head of a lug and between the same and the base of a detachable rim and the periphery of the felly of a wheel, respectively, and a portion on the shim to lie against the side of the felly and having a slot therein to fit around the lug securing bolt for the purpose specified.

4. In combination with a felloe and a demountable rim and a rim clamp, a tightening clip arranged to be located around said rim clamp and between the felloe and rim.

5. In combination with a felloe and a demountable rim and a rim clamp, a pliable tightening clip arranged to be located around said rim clamp and between the felloe and rim.

In testimony whereof I have affixed my signature in the presence of two witnesses.

JEFFERSON H. AKINS.

Witnesses:
F. A. BELL,
S. W. BARNES.